UNITED STATES PATENT OFFICE.

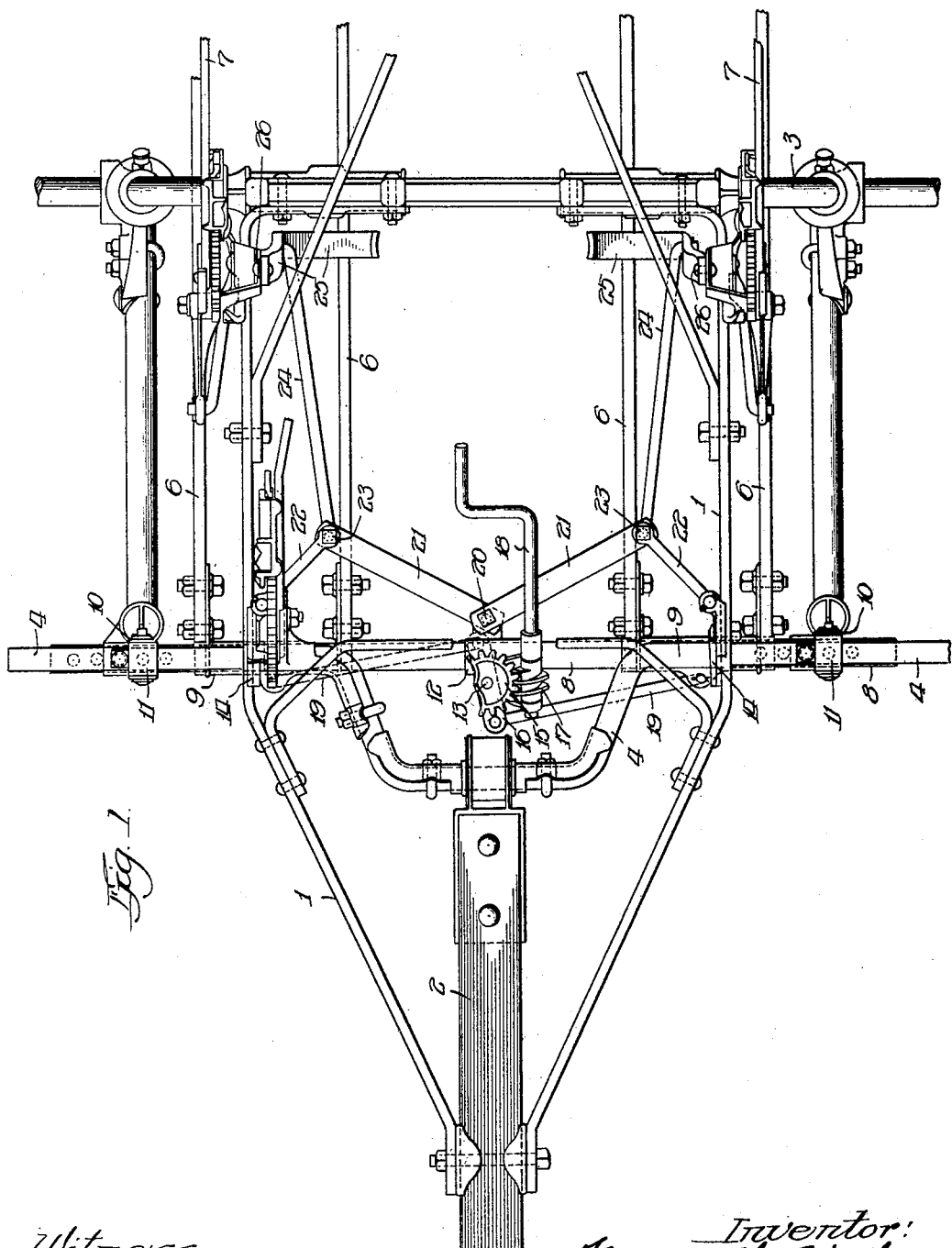

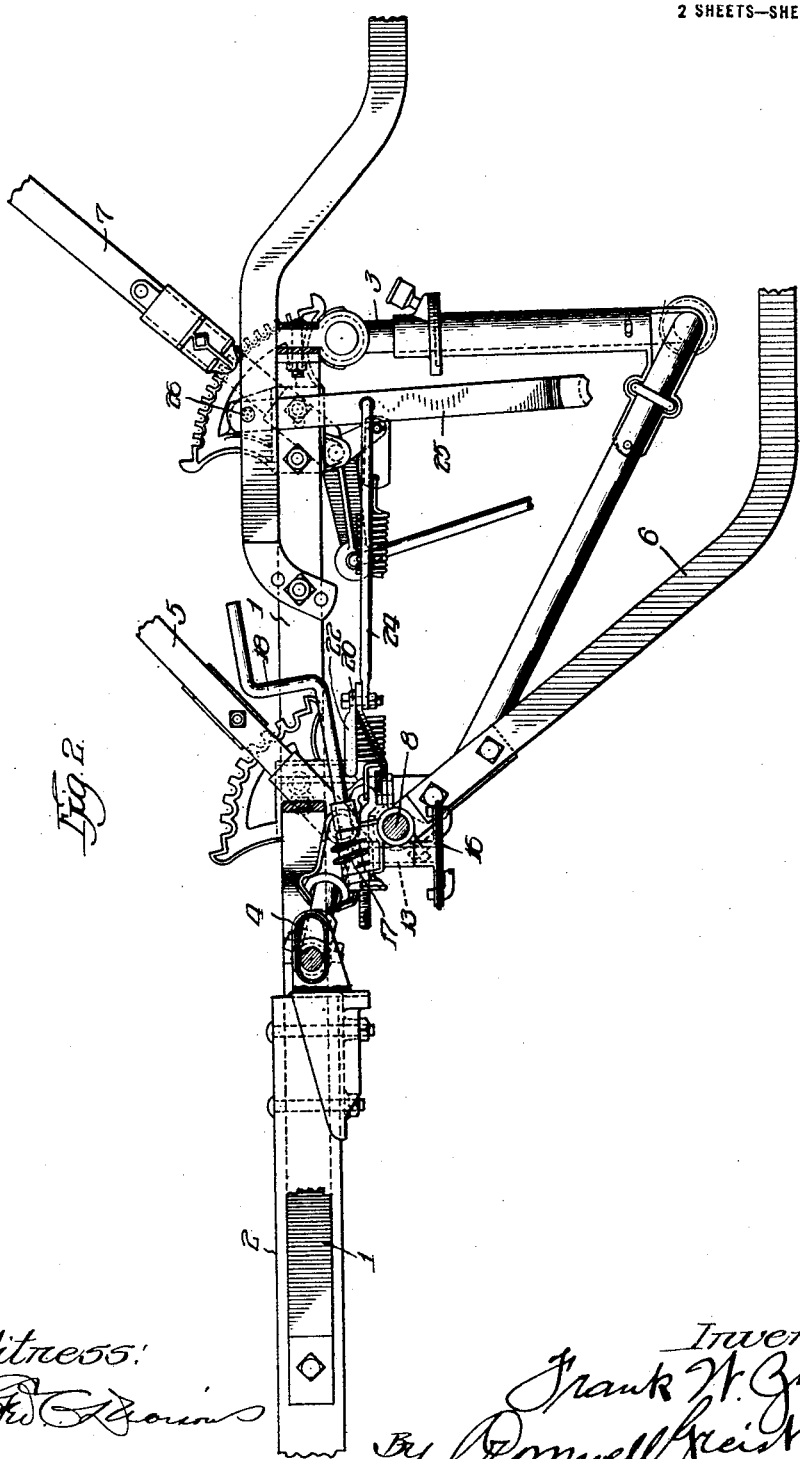

FRANK W. ZINT, OF SPRINGFIELD, ILLINOIS, ASSIGNOR TO MONTGOMERY WARD & CO., INC., OF CHICAGO, ILLINOIS, A CORPORATION OF ILLINOIS.

CULTIVATOR.

1,403,533.  Specification of Letters Patent.  Patented Jan. 17, 1922.

Application filed November 13, 1920. Serial No. 423,849.

*To all whom it may concern:*

Be it known that I, FRANK W. ZINT, a citizen of the United States, residing at Springfield, in the county of Sangamon and State of Illinois, have invented certain new and useful Improvements in Cultivators, of which the following is a specification.

This invention relates to agricultural machines of the cultivator type, although it is not limited in its application to cultivators only, and consists in certain improvements which I have made in the mechanism for sliding the beams carrying the cultivating implements and in the mechanism for shifting said beams laterally.

As is well known, it is a requisite of such cultivators and similar agricultural machines, having two implement-carrying beams, to be able to spread the same, that is, to widen or decrease the distance between the beams, at will, and it is also desirable to be able to bodily shift both beams laterally of the machine in either direction to enable the operator to follow crooked rows.

The object of this invention is, therefore, to provide a machine of this kind with convenient and easily operable mechanism for enabling the operator to accomplish both of these purposes at will, either separately or simultaneously.

In the drawing I have illustrated the invention as applied to a well-known type of cultivator, part of which only is shown.

Fig. 1 is a plan section of so much of the cultivator as is necessary to illustrate my invention; and Fig. 2 is a side elevation of the same.

For the purpose of disclosing the present invention and its mode of operation, it will be unnecessary to describe in detail such well-known parts of the machine as appear in the drawing, other than to state that 1 is the frame, 2 the tongue, 3 the cranked wheel shaft, and 4 the crank shaft, journaled in bearings 14 and actuated by the hand lever 5 to adjust the front ends of the beams 6—6, 7 being the hand levers to elevate the rear ends of the latter.

8 is a transverse shaft on which the front ends of the beams 6 are supported by means of the beam-coupling sleeves 9, mounted on said shaft. The shaft 8 is carried at each end in a bracket 10, rotatably mounted by roller bearings 11 on the ends of the crank shaft 4. On the center of shaft 8 is mounted a bracket 12, in which is journaled a vertical stud 13, carrying a worm segment 15 on its upper end and a double crank arm 16 on its lower end. This segment is actuated to turn said crank arm 16, by a worm 17 carried by a hand crank shaft 18. The ends of the crank arm 16 are connected by links 19 with the beam-coupling sleeves 9. It will be obvious that when crank arm 16 is rotated by means of the worm gearing, it will either pull or push on the links 19 and therefore will slide the sleeves 9, and the beams carried thereby, towards or away from each other according as to in which direction the hand crank shaft 18 is turned.

The bracket 12 has a lug to which are pivoted at 20 the links 21, each of which constitutes one member of a toggle joint, the other member of which is a link 22, pivoted to the adjacent bearing 14. To the pivoted joint 23 of each toggle is attached a connecting rod 24, the other end of which is connected to a swinging foot pedal 25, pivotally suspended on the frame at 26. Forward pressure on one of these pedals will straighten out the corresponding toggle and force bracket 12 and both beams 6 to slide to the right or left, according to which foot pedal is operated. Naturally the other or idle pedal is swung backwardly at this time by the closing of its toggle, and the beams are brought back to their original position by swinging this pedal forwardly again.

Having thus described my invention, what I claim is:

1. In a cultivator the combination with lateral frame members, of a longitudinally shiftable shaft extending transversely thereof, implement beams mounted on the shaft, a connecting bracket secured to the shaft between the frame members, a pair of toggle links at each side of said bracket, one link of each pair being pivoted on a frame member and the other having pivotal connection with said bracket, and operable means for straightening the respective toggles to shift the shaft.

2. In a cultivator the combination of rigidly related lateral frame members, a longitudinally shiftable shaft extending transversely thereof, implement beams shiftably mounted on said shaft, a bracket affixed to the shaft between said frame members, means operably mounted on said bracket for shifting said beams on the shaft, members forming a toggle at each side of said bracket, said toggles being fulcrumed respectively on said bracket and the respective frame members, and operable means for straightening the respective toggles to shift the shaft relative to the frame members.

In testimony whereof I have hereunto signed my name in the presence of two subscribing witnesses.

FRANK W. ZINT.

Witnesses:
  H. L. EHLMAN,
  J. E. STEVENS.